United States Patent
Ekanayake et al.

(10) Patent No.: US 9,576,745 B2
(45) Date of Patent: Feb. 21, 2017

(54) METHOD TO ENHANCE THE EFFICIENCY OF DYE SENSITIZED AND PEROVSKITE SOLAR CELL

(71) Applicants: Piyasiri Ekanayake, Gadong (BN); Ako Rajour Tanyi, Gadong (BN); Alwani Imanah Binti Rafieh, Gadong (BN); Tan Ai Ling, Gadong (BN); Lim Chee Ming, Gadong (BN)

(72) Inventors: Piyasiri Ekanayake, Gadong (BN); Ako Rajour Tanyi, Gadong (BN); Alwani Imanah Binti Rafieh, Gadong (BN); Tan Ai Ling, Gadong (BN); Lim Chee Ming, Gadong (BN)

(73) Assignee: Universiti Brunei Darussalam, Gadong (BN)

( * ) Notice: Subject to any disclaimer, the term of this patent is extended or adjusted under 35 U.S.C. 154(b) by 0 days.

(21) Appl. No.: 14/960,423

(22) Filed: Dec. 6, 2015

(65) Prior Publication Data
US 2016/0163469 A1    Jun. 9, 2016

Related U.S. Application Data

(60) Provisional application No. 62/088,591, filed on Dec. 6, 2014.

(51) Int. Cl.
*H01G 9/20* (2006.01)
*H01G 9/00* (2006.01)

(52) U.S. Cl.
CPC .......... *H01G 9/2031* (2013.01); *H01G 9/0029* (2013.01); *H01G 9/2036* (2013.01)

(58) Field of Classification Search
None
See application file for complete search history.

(56) References Cited

U.S. PATENT DOCUMENTS

| | | | | |
|---|---|---|---|---|
| 2004/0131934 A1* | 7/2004 | Sugnaux | ............... | B82Y 20/00 |
| | | | | 429/209 |
| 2013/0330597 A1* | 12/2013 | Kim | ..................... | H01M 4/364 |
| | | | | 429/163 |

OTHER PUBLICATIONS

Ako Rajour Tanyi et.al. Enhanced efficiency of dye-sensitized solar cells based on Mg and La co-doped TiO2 photoanodes, Electrochimica Acta 178 (2015) 240-248.

* cited by examiner

*Primary Examiner* — Calvin Choi
(74) *Attorney, Agent, or Firm* — Geeta Kadambi Riddhi IP LLC

(57) ABSTRACT

The present disclosure relates to a method to enhance the efficiency and reduce interfacial charge transfer resistance in dye sensitized solar cell (DSSC) and a perovskite solar cell (PSC) by fabricating with Mg and La doped photoanodes. Mg and La co-doped into $TiO_2$ has shown more than 20% efficiency than pristine $TiO_2$ and more than 5% higher efficiency than the single doping of 1% La and Mg in $TiO_2$ cells. Thus, the present disclosure relates to an improved photoanode material to be used in solar cells.

17 Claims, 2 Drawing Sheets

METHOD TO ENHANCE THE EFFICIENCY OF DYE SENSITIZED AND PEROVSKITE SOLAR CELL

CROSS REFERENCE TO RELATED APPLICATION

This application claims priority to pending U.S. Provisional application 62/088,591, filed on 6 Dec. 2014. The pending application 62/088,591 is hereby incorporated by reference in its entirety for all its teachings.

FIELD OF TECHNOLOGY

This disclosure generally relates to a method to enhance the efficiency of a solar cell. Further, the invention also relates to a composition comprising a metal co-doped $TiO_2$ photo-anode to enhance the efficiency of a dye sensitized solar cell and perovskite solar cell.

BACKGROUND

Dye sensitized solar cell that surfaced in the early 1990s from the pioneering work of Micheal Gratzel and Brian O' Regon highlighted the use of cheaper, easily manufactured materials and a more sustainable approach to convert sunlight to electrical power. These cells from front to the back, are made up of a transparent conductive oxide coated glass (TCO), a porous metal oxide layer (the anode) to support light sensitive adsorbed dye molecules and also to aid in electron transport to the TCO, a liquid/solid-state electrolyte that facilitates electron transfer for dye regeneration by ion transport from redox reactions. The electrolyte is sandwiched between the anode and a TCO coated platinum cathode to catalyze the reduction and oxidation reactions of the redox species in the electrolyte (O'Regan and Gratzel; 1991). This cell technology has shown high prospects over amorphous silicon and hetero-junction solar cells which have production cost due to their very high purity requirements.

Since few years different materials of varying optical and electrical properties (WO2011041762A2, 2011); particles of varying morphology and architecture; dyes with different aggregation; speed of electron injection and HOMO-LUMO gaps; and electrolyte with different redox potentials and faster redox reactions, to enhance electron transport and reduce back current within the cell thereby increasing the efficiency of converting sunlight to electrical current are bring introduced.

SUMMARY

The present invention discloses a method to enhance the efficiency of a solar cell. Further, the present invention discloses a composition comprising a metal co-doped $TiO_2$ photo-anode to enhance the efficiency of a dye sensitized solar cell (DSSC) and a perovskite solar cell (PSC).

In one embodiment, the present invention discloses a method of enhancing the efficiency of DSSC and PSC using a metal co-doped photoanode. In another embodiment, the present invention discloses a method of enhancing the efficiency of DSSC and PSC using a Mg and La $TiO_2$ photoanode.

In one embodiment, a method of synthesizing a metal co-doped such as Mg and La co-doped photoanode is disclosed. The method comprises synthesis of a pure $TiO_2$ by sol-gel and hydrothermal method wherein titanium isopropoxide is used as a source of $TiO_2$. In another embodiment, single Mg and La doped $TiO_2$ and Mg and La $TiO_2$ were synthesized wherein magnesium and lanthanum acetate salt was used as an impurity source. In some embodiments, the concentration of metal impurity for doping into $TiO_2$ is in the range of 0.1 mol % to 5 mol %.

In one embodiment, 2-propanol is used as a solvent for the synthesis of Mg and La doped $TiO_2$ wherein the quantity of the solvent and the quantity of titanium source may be adjusted to have different concentrations of $Ti^{4+}$. In another embodiment, the concentration of $Ti^{4+}$ may vary from 0.1-0.2M preferably 0.005 to 0.1M.

In one embodiment, particle size of Mg and La doped $TiO_2$ may be controlled using pre-determined conditions during the synthesis process. In another embodiment, different morphologies of Mg and La doped $TiO_2$ powders can be produced by adjusting the pH and selecting different solvents.

In one embodiment, mass of Mg and La salt is changed for different concentration of impurity with respect to $Ti^{4+}$ ions. In another embodiment, the concentration range may vary from 0.01 to 3 mole percent concentration with respect to $Ti^{4+}$ ions preferably 0.01 to 2 mole percent concentrations with respect to $Ti^{4+}$ ions.

In one embodiment, sol-gel method is further followed by hydrothermal process wherein the particle size of Mg and La doped $TiO_2$ may be controlled by using different pH. In another embodiment, the particle size may be controlled by applying different amount of acetic acid before the hydrothermal process. In some embodiment, a nanocrystalline doped $TiO_2$ powder is used to make anode for DSSC and PSC.

In one embodiment, photoanode can be made with Mg and La doped powder of different morphology and size. In another embodiment, film thickness of the photoanode may be adjusted by spin coating at different rpm. The photoanode as prepared is dipped into a dye solution overnight followed by washing with ethanol and kept to dry. The dye solution as disclosed is made from N719 dye.

In one embodiment, a cell is assembled with photoanode fabricated with Mg and La doped $TiO_2$ powders. In another embodiment, the cell is assembled by stacking the photoanode as disclosed with a cathode sandwiched by an electrolyte.

In one embodiment, film thickness of the oxide film on the TCO will be in a range of 100 nm to 30 microns preferably 200 nm to 15 microns. In another embodiment, the film thickness allows a significant amount of dye absorption and electrolyte diffusion.

In one embodiment, a method of synthesizing Mg and La co-doped photoanode comprises: synthesizing a pure $TiO_2$, a single and a double Mg and La doped $TiO_2$ using a sol-gel method; synthesizing a photoanode; assembling the photoanode with the Mg and La doped $TiO_2$; and assembling a cell with Mg and La doped $TiO_2$ photoanode.

In one embodiment, a composition comprising a cell with a metal co-doped photoanode is disclosed. In another embodiment, a composition comprising a cell with a Mg and La co-doped photoanode is disclosed.

Other features will be apparent from the accompanying figures and from the detailed description that follows.

BRIEF DESCRIPTION OF THE DRAWINGS

Embodiments are illustrated by way of example and no limitation in the accompanying figures, like references indicate similar elements and in which.

DETAILED DESCRIPTION

Figure 1:
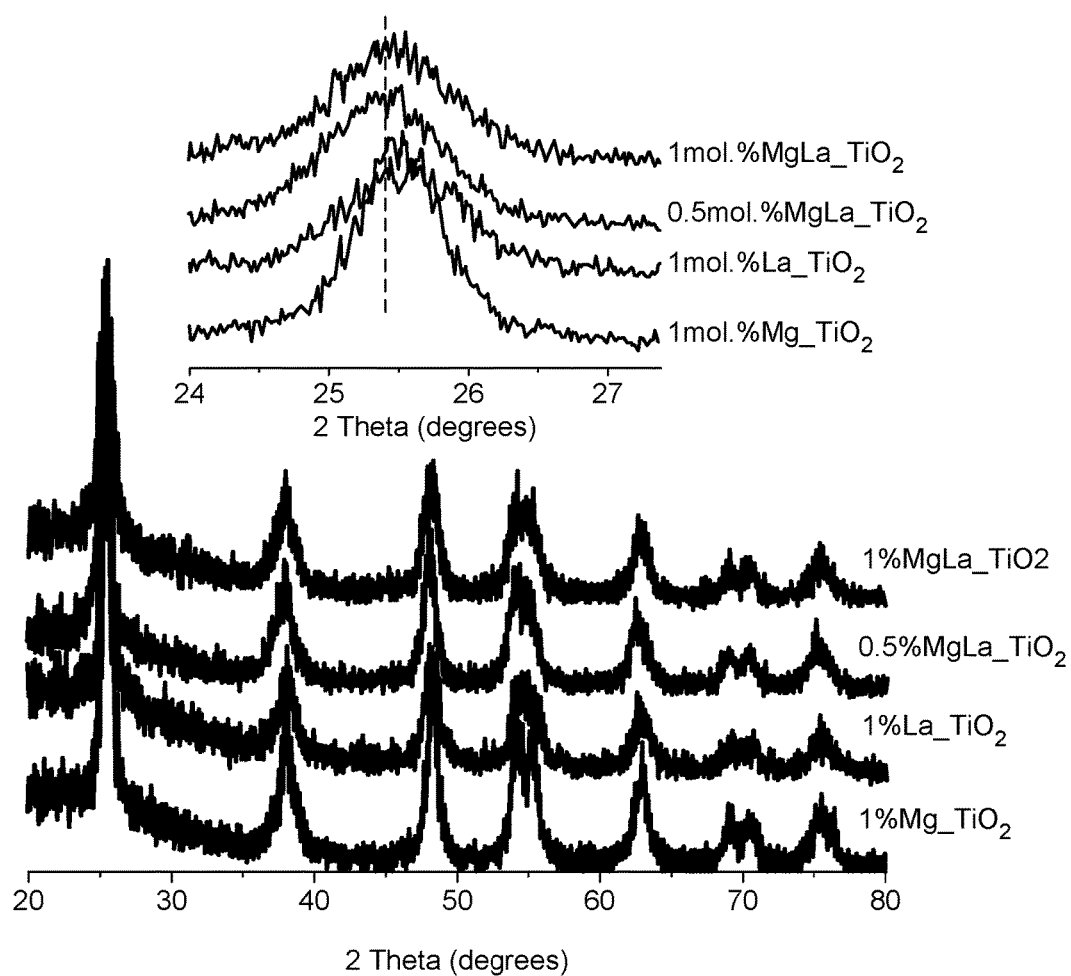
FIG. 1 shows X-ray diffraction (XRD) analysis of powders of 0.5 and 1 mol % Mg and La co-doped $TiO_2$, 1 mol % La and Mg single doped $TiO_2$.

The present invention discloses a DSSC and a PSC with higher efficiency, enhanced charge transfer and reduced recombination using fabricated Mg and La photoanodes. The DSSC and PSC with Mg and La $TiO_2$ anodes help in increasing dye absorption and solve electron injection problems faced by single Mg doped $TiO_2$ anodes (Zhang et al., 2011); in reducing the recombination of injected free electrons with the electrolyte due to negative band edge shift caused by Mg ions and generate trapped states for longer lifetime of excited electrons caused by the presence of defects and the presence of interstitial La ions with empty 'f' orbitals.

As an experimental example to the disclosed method, the short circuit current ($J_{sc}$) for the samples was significantly enhanced with a high open circuit voltage ($V_{oc}$) thereby producing cells with 20% higher efficiencies than those with our $TiO_2$ anodes and 5% higher than La doped $TiO_2$ anodes. The transport properties of La and Mg co-doped $TiO_2$ cells were observed with the help of Electrochemical Impedance Spectroscopy (EIS) measurements to have higher charge transfer resistances and longer electron lifetime than their doping counterparts, attributed to the negative band edge shifts and reduced trap defects concentration caused by the presence of the two metal ions within the lattice of the $TiO_2$. Cells with 0.5% Mg and La co-doped $TiO_2$ photoanodes gave 8.04% efficiency, 5% higher than La doped $TiO_2$ cells (efficiency 7.7%), 15% higher than Mg doped $TiO_2$ photoanodes (efficiency 6.9) and 20% higher than pristine $TiO_2$ (efficiency 6.7%).

Materials

The following chemicals are used in this work: Titanium (IV) isopropoxide, TTIP (97%, Sigma-Aldrich), 2-propanol (97%, Sigma-Aldrich), Magnesium Acetate tetrahydrate $(CH_3COO)_2Mg.4H_2O$ (>99.9%, Sigma Aldrich), Lanthanum (III) acetate hydrate, $La(CH_3CO_2)_3.xH_2O$ (>99.9%, Sigma-Aldrich), Absolute Ethanol (>99%, Sigma-Aldrich) and deionized water (DI).

Synthesis of Mg and La Co-Doped, Single Doped and Pure $TiO_2$ Powders:

A sol gel method was used to synthesize pure $TiO_2$ and the single and double Mg and La doped $TiO_2$. To prepare pure $TiO_2$, 3.0 g TTIP was added to 100 mL of IPA (to make 0.1M TTIP) and stirred for 30 mins. Next, 5 drops of HCl was added to the solution, and stirred for 10 to 15 mins. 15 mL of DI $H_2O$/IPA mixture of 1:10 v:v prepared separately was added drop wise to the TTIP/IPA mixture allowed to stirred for another 3 to 4 hours, until the solution became cloudy. The resulting slightly cloudy solution was kept overnight for jellification. The final jell was dried in an oven, and a white powder was obtained and washed many times with absolute alcohol before drying. Next, the powder was crystallized by sintering in a furnace at 500° C. with a ramp time of 2 hrs and dwelling time of 5 hrs. For the single and co doped powders, required amounts were measured and heated in an oven at 100° C. for more than 2 hrs to remove all water of crystallization before adding to the TTIP/IPA mixture.

Preparation of Photoanodes:

4 g of the crystalized metal doped anatase powders were mixed with 24 drops of acetic acid [>99%, Sigma-Aldrich], a drop of Triton™ X-100 [laboratory grade, Sigma-Aldrich] and 5 mL of absolute ethanol was added to the paste. The mixture was then sealed tight and ball milled overnight. The resulting paste was removed, and stirred in an agate mortar until an appropriate viscosity was achieved before pasting onto the FTO conducting glass substrate.

Assembly of Photoanodes into a Cell:

Fluorine doped Tin oxide coated glass [Nippon sheet glass 10-12 $\Omega sq^{-1}$] was carefully cut in to flakes of 2 cm×0.5 cm. The glass flakes were washed in isopropanol and in ethanol for 10 mins consecutively using an ultrasound bath. After washing, the cleaned and dried flakes were heated on a heating tub at 300° C. for another 10 mins and kept ready for pasting on. The paste with required viscosity was doctor bladed on the clean FTO conducting glass substrates and left to dry before scrapping to a required active area (0.5×0.5) $cm^2$. All prepared anodes were ramped to 500° C. in the furnace in air for 30 mins and a dwelling time of 10 mins to remove all carbon compounds. The additive-free electrodes were dipped in ruthenium N719 dye [((cis-diisothiocyanato-bis (2,2'-bipyridyl-4,4'-dicarboxylato) ruthenium(II) bis (tetrabutylammonium), DYSOL, Switzerland, Australia] overnight at room temperature after which they were removed, washed with excess ethanol and dried. The dry dyed films were used directly as photo-anodes for DSSC, where each was combined with a Pt-coated glass counter electrode, and sandwiched with electrolyte [EL-HPE, High performance Electrolyte, DYSOL]. The electrolyte was introduced by placing a drop on the active area of the photo-anode, and the counter electrode placed carefully on it, after which both electrodes were held firm together by crocodile clips. Current-voltage and EIS measurements were later performed after a stabilization time of 20 mins in normal room exposure.

Characterization of the Assembled Cell:

To confirm that the impurities do not affect the phase composition of the $TiO_2$ and to ensure (but not quantified) that some of the metal impurities actually got substituted into the $TiO_2$ lattice structure, XRD measurements were carried out with SHIMADZU Maxima-X, 7000 series at a voltage and current of 40 kv and 30 mA, respectively. The XRD is set to scan at a step size of 0.02 deg, and the scan speed of 2 deg/min over 20°≤2theta≤80° using $CuK\alpha$ radiation of 1.54060 A. The Voc, FF and Jsc of the assembled cells are estimated from current-voltage using a Kiethley Source meter (2400, KIETHLEY source meter) after exposing the cells to approximately 0.9 sunlight (~100 mW/$cm^2$) under white light condition.

The electronic processes taking place within the DSSC; charge transport resistance and recombination kinetics, are analyzed by Electrochemical Impedance spectroscopy (EIS) using Solartron SI 1260 Impedance/Gain-phase Analyzer in standalone mode. The EIS spectra were collected in the dark over the frequency range 0.01 Hz to 1 MHz at room temperature. A series of Nyquist plots for the Imaginary vs real impedance were recorded at different negative bias voltages of 0.25V to 0.5 V for an interval of 50 mV and at amplitude of 10 mV.

Results and Analysis

FIG. 1 shows that distinct diffraction peaks corresponding to 101, 004, 200, 105, 211, 204, 116, 220, 215 diffraction peaks of anatase. However, these peaks are quite shifted to higher degrees, due to lattice distortion caused by the incorporation of the dopant ions into the $TiO_2$ lattice. To further confirm this incorporation, no extra peaks can be seen for these concentrations of doping. The insert of FIG. 1 represents the 101 diffraction peak for the stated samples. It can now be observed that, the shifts of 1 mol % concentrations are slightly greater than that of 0.5 mol % Mg and La $TiO_2$ powders. This indicates lesser crystal distortions for 0.5 mol % Mg and La co-doped $TiO_2$ than the other samples. It should be clarified that 0.5 mol % Mg and La powders has a total of 1 mol % impurity. Thus, it shows an approximate amount of impurity into $TiO_2$, while minimizing the defect concentration for effective charge transport. This is confirmed further by increased resistance to charge recombination for DSSC with 0.5 mol % Mg and La co-doped $TiO_2$ anodes compared to other cells with single doped and pure photoanodes.

Figure 2:
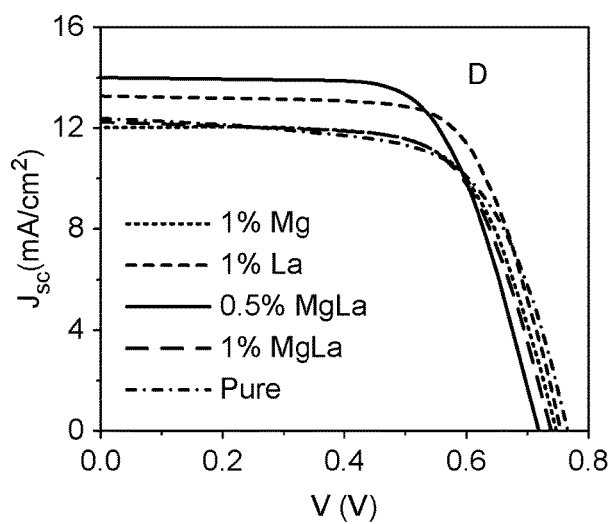
FIG. 2 shows current density Vs voltage (J-V) curves from a set of DSSC comprising cells with 0.5 and 1 mol % Mg and La co-doped $TiO_2$ anodes, 1 mol % Mg and La single doped $TiO_2$ anodes and pure $TiO_2$ anodes.

The current density-voltage curves in FIG. 2 compares the performance of the DSSC with the different photoanodes. The DSSC all had an active area of 0.25 cm² and calibrated under same conditions and exposure time as explained above in the detained description. The cells parameters are compared based on the single and co-doping and the mol percentages of the different dopant ions present in the lattice of the $TiO_2$ anode. The cell with 0.5 mol % Mg and La photoanode showed the highest short circuit current, $J_{sc}$ of 14.2 mA/cm² and power to current conversion efficiency (PCE) of 8.1%. This is a 20% calculated improvement over cells with pure $TiO_2$ anode which had a $J_{sc}$ of 12.4 and A PCE of 6.7%. On the other hand, cells with 1 mol % La and Mg single doped $TiO_2$ anodes recorded $J_{sc}$ of 13.3 and 12.2 respectively and PCEs of 7.7% and 6.9% respectively. Therefore, the invention presents a cell with 0.5 mol % Mg and La co-doped $TiO_2$ anode with an approximate PCE increase of 5% and 17% over cells and 1 mol % La and Mg single doped $TiO_2$ anodes respectively. This can first be attributed to the slightly less distortion as observed in the XRD analysis of FIG. 1. Cells with higher percentage of dopant concentration higher and lower than those mentioned above show lower DSSC photovoltaic performances, attributed to either higher trap concentrations (for percentage higher than 1 mol % for single doping and higher than 0.5 mol % for double doping) that lead to recombination at trap sites. Cells with lower concentrations of dopant than 0.5 mol % for double doping and 1 mol % for single doping, showed lower DSSC photovoltaic performances as well attributed to less concentration of traps and detrapping sites to curb recombination and increase electron life time. The table below (Table 1) shows the DSSC parameters.

TABLE 1

DSSC performance parameters from current-voltage measurements.

| Batch Number | FF | Eff (%) | Voc (V) | Isc (mA) | Pmax (mW) | Vmp | Imp | Area |
|---|---|---|---|---|---|---|---|---|
| pure $TiO_2$ | 0.639 | 6.703 | 0.763 | 3.094 | 1.508 | 0.593 | 2.542 | 0.25 |
| 0.5% La | 0.657 | 7.607 | 0.719 | 3.628 | 1.712 | 0.523 | 3.273 | 0.25 |
| 0.5% Mg | 0.703 | 7.046 | 0.781 | 2.886 | 1.585 | 0.601 | 2.639 | 0.25 |
| 0.5% MgLa | 0.687 | 8.044 | 0.743 | 3.546 | 1.810 | 0.553 | 3.272 | 0.25 |
| 1% La | 0.690 | 7.676 | 0.751 | 3.329 | 1.727 | 0.567 | 3.044 | 0.25 |
| 1% Mg | 0.686 | 6.845 | 0.744 | 3.016 | 1.540 | 0.560 | 2.749 | 0.25 |
| 1% MgLa | 0.677 | 6.765 | 0.733 | 3.067 | 1.522 | 0.564 | 2.698 | 0.25 |
| 2% La | 0.733 | 5.654 | 0.767 | 2.262 | 1.272 | 0.612 | 2.077 | 0.25 |
| 2% Mg | 0.712 | 5.499 | 0.782 | 2.223 | 1.237 | 0.608 | 2.035 | 0.25 |
| 2% MgLa | 0.686 | 6.845 | 0.744 | 3.016 | 1.540 | 0.560 | 2.749 | 0.25 |

Figure 3:
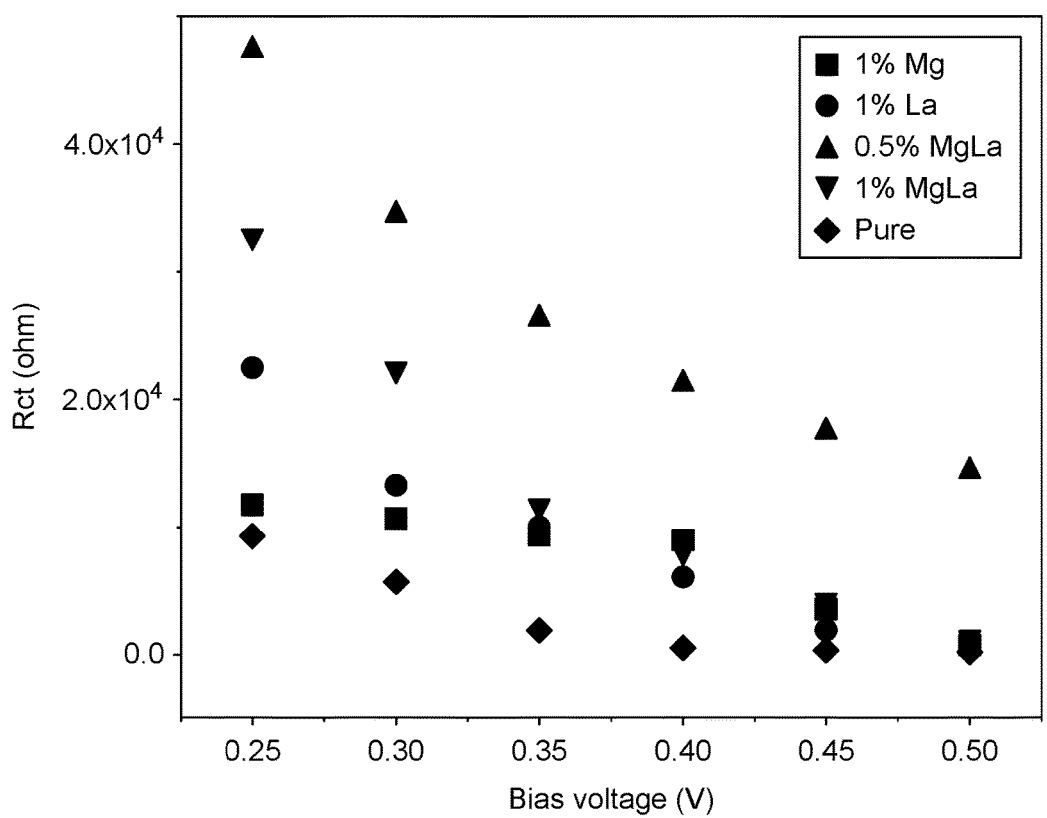
FIG. 3 shows recombination resistance plotted against bias voltages for the co-doped, single doped and pure $TiO_2$ DSSC measured using EIS measurements.

FIG. 3 presents a charge transfer study in the DSSC with anodes of the different metal doped $TiO_2$ samples. It is observed that cells with 1 mol % La doped $TiO_2$ show higher resistance to recombination compared to cells with 1 mol % Mg doped $TiO_2$ and those with pure $TiO_2$ photoanodes. The doped $TiO_2$ photoanodes all show higher resistance to recombination than the pure $TiO_2$, due to the slight increase in concentration of trap sites hence their higher cell efficiency. The higher charge transfer resistance (or low rate of recombination) for cells with La doped $TiO_2$ photoanode can be attributed to the filling of the empty 'f' suborbitals of the La ion, the smaller particle size and higher dye adsorption or the increase in oxygen vacancy reported (Zhang., 2010). Interestingly, cells with 0.5 and 1% Mg and La $TiO_2$ photoanodes show enhanced charge transport properties due to the additional/combine effect of the presence of La and Mg ions in the $TiO_2$ lattice that increase both injection at the oxide-dye as well as reduces the rate of electron recombination at the oxide-electrolyte interfaces. Cells with 0.5 mol % Mg and La cells show higher resistance to recombination and hence higher cell efficiency due to appropriate concentration of trap sites and energy level distribution relative to their 1 mol % single doping counterparts. Therefore, 1 mol % Mg and La doped $TiO_2$ cells have a higher defect compared to those of 2 mol % single doping cells.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method of synthesizing a solar cell, comprising:
   synthesizing a metal co-doped powder, wherein the synthesizing is done using following steps:
   creating a first mixture by stirring 3 gm Titanium (IV) isopropoxide and 100 ml propanol for 30 minutes at room temperature and then adding 0.0113 g Mg and 0.0167 g La;
   creating a second mixture by stirring 5 ml distilled water and 50 ml propanol for 30 minutes at room temperature;
   creating a third mixture by adding 5 drops of HCL in the first mixture;
   creating a fourth mixture by adding the second mixture into the third mixture dropwise until a gel is formed; and
   creating fifth mixture by drying the fourth mixture at 100 degrees centigrade until it becomes a powder;
   synthesizing a photoanode with the metal co-doped powder; and
   assembling the solar cell with the photoanode, wherein assembling the solar cell with the photoanode enhances the efficacy of the solar cell, the assembling includes
   creating a sixth mixture by ball milling 0.5 gm the fifth mixture, 4 ml absolute ethanol, 24 drops of acetic acid, 2 drops of Triton X for 20 hours;
   creating a seventh mixture by sonicating the sixth mixture for 10 minutes;
   creating an eighth mixture by stirring the seventh mixture until the seventh mixture becomes more viscous; and
   creating photoanode by putting the eighth mixture on a conducting glass using doctor blading method and heating the conducting glass at 450 degrees centigrade.

2. The method of claim 1, wherein the method further comprises synthesizing a metal co-doped titanium oxide (TiO$_2$) powder.

3. The method of claim 2, wherein the metal co-doped TiO$_2$ powder is synthesized by a sol-gel method.

4. The method of claim 2, wherein the metal co-doped TiO$_2$ powder is synthesized by a hydrothermal method.

5. The method of claim 1, wherein the method comprises Mg and La co-doped powder.

6. The method of claim 1, wherein the solar cell is a dye-sensitized solar cell.

7. The method of claim 5, wherein the method comprises 0.5% Mg and 0.5% La co-doped powder.

8. The method of claim 1, wherein the Mg and La salt vary from 0.01 to 3 mole percent concentration of the impurity with respect to Ti$^{4+}$ ions for synthesizing metal co-doped TiO$_2$ powder.

9. The method of claim 1, wherein the method shows a 20% improvement over cells with pure TiO$_2$ photoanode only.

10. A method of synthesizing a perovskite solar cell, comprising:
    synthesizing a metal co-doped powder; wherein the synthesizing is done using following steps:
        creating a first mixture by stirring 3 gm Titanium (IV) isopropoxide and 100 ml propanol for 30 minutes at room temperature and then adding 0.0113 g Mg and 0.0167 g La;
        creating a second mixture by stirring 5 ml distilled water and 50 ml propanol for 30 minutes at room temperature;
        creating a third mixture by adding 5 drops of HCL in the first mixture;
        creating a fourth mixture by adding the second mixture into the third mixture dropwise until a gel is formed; and
    creating fifth mixture by drying the fourth mixture at 100 degrees centigrade until it becomes a powder;
    synthesizing a photoanode with the metal co-doped powder; and
    assembling the perovskite solar cell with the photoanode, wherein assembling the perovskite solar cell with the photoanode enhances the efficacy of the solar cell.

11. The method of claim 10, wherein the method further comprises synthesizing a metal co-doped titanium dioxide (TiO$_2$) powder.

12. The method of claim 11, wherein the metal co-doped TiO$_2$ powder is synthesized by a sol-gel method.

13. The method of claim 11, wherein the metal co-doped TiO$_2$ powder is synthesized by a hydrothermal method.

14. The method of claim 10, wherein the method comprises Mg and La co-doped powder.

15. The method of claim 14, wherein the method comprises 0.1-0.5% Mg and 0.1-0.5% La co-doped powder.

16. The method of claim 10, wherein the Mg and La salt vary from 0.01 to 3 mole percent concentration of the impurity with respect to Ti$^{4+}$ ions for synthesizing metal co-doped TiO$_2$ powder.

17. The method of claim 10, wherein the method shows a 20% improvement over cells with pure TiO$_2$ photoanode only.

* * * * *